US009213908B2

United States Patent
Benhimane et al.

(10) Patent No.: US 9,213,908 B2
(45) Date of Patent: Dec. 15, 2015

(54) METHOD FOR REGISTERING AT LEAST ONE PART OF A FIRST AND SECOND IMAGE USING A COLLINEATION WARPING FUNCTION

(75) Inventors: Selim Benhimane, Munich (DE); Daniel Kurz, Munich (DE)

(73) Assignee: Metaio GmbH, Munich (DE)

( * ) Notice: Subject to any disclaimer, the term of this patent is extended or adjusted under 35 U.S.C. 154(b) by 260 days.

(21) Appl. No.: 14/006,859

(22) PCT Filed: Mar. 23, 2011

(86) PCT No.: PCT/EP2011/054456
§ 371 (c)(1),
(2), (4) Date: Dec. 2, 2013

(87) PCT Pub. No.: WO2012/126522
PCT Pub. Date: Sep. 27, 2012

(65) Prior Publication Data
US 2014/0086494 A1    Mar. 27, 2014

(51) Int. Cl.
*G06K 9/62*   (2006.01)
*G06K 9/32*   (2006.01)
*G06T 3/00*   (2006.01)
*G06T 7/00*   (2006.01)

(52) U.S. Cl.
CPC ............... *G06K 9/32* (2013.01); *G06T 3/0093* (2013.01); *G06T 7/0028* (2013.01); *G06T 2207/30208* (2013.01); *G06T 2207/30244* (2013.01)

(58) Field of Classification Search
None
See application file for complete search history.

(56) References Cited

U.S. PATENT DOCUMENTS

| 5,682,332 | A  |    | 10/1997 | Ellenby et al. |
| 6,816,187 | B1 | *  | 11/2004 | Iwai et al. ...................... 348/187 |
| 7,023,536 | B2 |    | 4/2006  | Zhang et al. |

(Continued)

FOREIGN PATENT DOCUMENTS

| DE | 102005025470 | 12/2006 |
| DE | 102007055252 | 5/2009 |

(Continued)

OTHER PUBLICATIONS

Japanese office action for JP 2014-500263 dated Oct. 21, 2014.

(Continued)

*Primary Examiner* — Chan Park
*Assistant Examiner* — Mai Tran
(74) *Attorney, Agent, or Firm* — Blank Rome LLP

(57) ABSTRACT

The invention is related to a method for registering at least one part of a first image and of a second image, including the steps of providing a first image of the real environment and a coordinate system associated to the first image, a second image of the real environment, and measurements of orientation and/or distance of a capturing device with respect to the real environment while capturing the second image. A collineation warping function is then determined from the measurements associated to at least one part of the second image. The method further includes the steps of transforming the at least one part of the second image by applying the corresponding determined collineation warping function, determining a second warping function for registering the transformed at least one part of the second image and the at least one part of the first image by means of an image registration method, and registering the at least one part of the second image and first image using the collineation warping function and the second warping function.

24 Claims, 6 Drawing Sheets

(56) References Cited

U.S. PATENT DOCUMENTS

| | | |
|---|---|---|
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,803 B1 | 9/2007 | Murata et al. |
| 7,268,956 B2 | 9/2007 | Mandella |
| 7,474,809 B2 | 1/2009 | Carl et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 2003/0086002 A1* | 5/2003 | Cahill et al. ............... 348/218.1 |
| 2005/0168437 A1 | 8/2005 | Carl et al. |
| 2011/0227915 A1 | 9/2011 | Mandella et al. |
| 2012/0038549 A1 | 2/2012 | Mandella et al. |
| 2012/0236133 A1* | 9/2012 | Gallagher ....................... 348/60 |
| 2013/0194418 A1 | 8/2013 | Gonzalez-Banos et al. |
| 2013/0223762 A1* | 8/2013 | Nagamasa ................... 382/293 |

FOREIGN PATENT DOCUMENTS

| | | |
|---|---|---|
| EP | 1556805 | 8/2011 |
| JP | 2000331145 | 11/2000 |
| JP | 2004053447 | 2/2004 |
| JP | 2008309595 | 12/2008 |
| WO | 2009138069 | 11/2009 |

OTHER PUBLICATIONS

Kurz et al. "Grabity-Aware Handheld Augmented Reality", Mixed and Augmented Reality (ISMAR), 2011, 10th IEEE International Symposium, Oct. 26, 2011, pp. 111-120.

* cited by examiner

Fig. 1 (standard approach)

METHOD FOR REGISTERING AT LEAST ONE PART OF A FIRST AND SECOND IMAGE USING A COLLINEATION WARPING FUNCTION

This application is entitled to the benefit of, and incorporates by reference essential subject matter disclosed in PCT Application No. PCT/EP2011/054456 filed on Mar. 23, 2011.

BACKGROUND OF THE INVENTION

1. Technical Field

The present invention relates to a method for registering at least one part of a first and second image using a collineation warping function. Moreover, the present invention relates to a computer program product comprising software code sections for implementing the method.

2. Background Information

Such a method is often required in computer vision applications such as augmented reality (AR) applications. For example, given a first image T as template image, many applications in the field of computer vision require to spatially register at least part of a second image I which is a current camera image to it. Examples include panorama stitching and camera pose estimation, for example for a video-see-through augmented reality application. Assuming a perfect pinhole camera that does not have any lens distortions, the transformation of any part of the template corresponding to a planar surface to its corresponding position in a current camera image is composed of a 3D translation followed by a 3D rotation and finally a perspective projection onto the image plane. This transformation can be fully described with a collineation W representing a perspective transformation between the 2D points on the template and the 2D corresponding points in the camera image.

The collineation is often represented by a (3×3) matrix that is invertible. The matrix is defined up to a scale and has eight degrees of freedom and could be written as:

$$W = \begin{bmatrix} p1 & p2 & p3 \\ p4 & p5 & p6 \\ p7 & p8 & 1 \end{bmatrix}$$

The collineation defines a one-to-one and onto warping. The collineation warping function transforms a point x=[u,v] from a first image into a point x'=[u',v'] in a second image as follows:

$$u'=(p1\ u+p2\ v+p3)/(p7\ u+p8\ v+1)$$

$$v'=(p4\ u+p5\ v+p6)/(p7\ u+p8\ v+1)$$

Such warping preserves collinearity, concurrency, order of contact and cross ratio. There are two divisions per warped point which makes the warping expensive in terms of computational cost.

The collineation warping is called affine warping when the entries p7 and p8 of the corresponding matrix are equal to zeros. The collineation can then be represented with a matrix $$A = \begin{bmatrix} p1 & p2 & p3 \\ p4 & p5 & p6 \\ 0 & 0 & 1 \end{bmatrix}$$

Therefore, the affine warping function transforms a point [u,v] from the first image into a point [u',v'] in a second image as follows:

$$u'=p1\ u+p2\ v+p3$$

$$v'=p4\ u+p5\ v+p6$$

Note that in this case the number of operations for an affine warping is lower than for a standard collineation warping function. Especially, since there is no division in the affine warping function, it is much faster on limited computational power devices.

Additionally, and among others, the affine warping preserves parallelism and ratio of distances.

When the the first and the second image are acquired such that the image plane is parallel to a certain planar surface then the collineation warping corresponding to that planar surface is an affine warping.

In the art, the following references have been published in this field:

[1] C. Steger. Occlusion, clutter, and illumination invariant object recognition. Int. Arc. Photo. Remote Sensing, XXXIV, part 3A:345-350, 2002.

[2] B. Lucas and T. Kanade. An iterative image registration technique with an application to stereo vision. In Proceedings of the International Joint Conference on Artificial Intelligence, 1981.

[3] Wonwoo Lee et al. Point-and-Shoot for Ubiquitous Tagging on Mobile Phones. Proc. International Symposium on Mixed and Augmented Reality 2010.

[4] Myung Hwangbo, Jun-Sik Kim, and Takeo Kanade. Inertial-Aided KLT Feature Tracking for a Moving Camera. The 2009 IEEE/RSJ International Conference on Intelligent Robots and Systems.

[5] Lobo, J. and Dias, J. Vision and Inertial Sensor Cooperation Using Gravity as a Vertical Reference. IEEE Transactions on Pattern Analysis and Machine Intelligence. Volume: 25 Issue: 12, pages 1597-1608.

[6] Simon Baker and Iain Matthews. Equivalence and Efficiency of Image Alignment Algorithms. Proceedings of the 2001 IEEE Conference on Computer Vision and Pattern Recognition.

[7] S. Hinterstoisser, V. Lepetit, S. Benhimane, P. Fua, and N. Navab. Learning Real-Time Perspective Patch Rectification. International Journal of Computer Vision, 2010.

A standard approach for finding a transformation as mentioned above is displayed in FIG. 1.

In a first step S1 one or multiple template or reference images (first image) are captured by a camera or loaded from a source. Then at first, a current image (second image) is either captured or loaded (step S2). In the next step S3 the actual estimation takes place. A collineation warping function has to be found that registers at least part of the current image and the corresponding position in the template image. Among other techniques, this can be done in an iterative minimization process where a first set of pixels in the template image is compared with a computed set of pixels in the current camera image and the computed set of pixels in the camera image used for the comparison varies at each iteration, see for example [2].

Mathematically all approaches for registering at least part of a camera image with at least part of the template image carry out an eight-dimensional non-linear optimization. The goal is to find a vector of warping parameters that result in an extremum of a similarity measure between the template and the warped current image over all pixels corresponding to the template image. This is usually a computational very expensive task.

Finally in step S4 the found collineation warping function W is used in an application.

The standard approaches provide the following limitations:

The eight-dimensional non-linear optimization needed to find a collineation warping function that registers at least part of the current image with a template image is expensive and makes applications relying on it particularly challenging on mobile devices with limited processing power. In iterative approaches, such as in Lucas-Kanade [2], expensive nonlinear warping of pixels in the current image has to be computed in every iteration in order to compute the similarity with the template.

Besides computational complexity, the memory consumption can be tremendous in approaches that transform the template in many possible ways in an offline step. The number of pre-computed transformations and therefore memory consumption increases (exponentially) with the degrees of freedom (DoF). For an arbitrary rigid transformation there are 6 DoF (3D translation and 3D rotation). For each current image such approaches try to find the pre-computed transformation closest to the current one, see e.g. [1]. The enormous amount of pre-computed data needed makes them not feasible on memory limited devices such as mobile phones.

There exist already proposed solutions, in which weak perspective projection approximates perspective by scaled orthographic projection (i.e., a linear transformation). While this approximation allows for linear warping which is in general faster to compute than non-linear warping, it can only be used for image registration if the template is located close to the optical axis and far away from the camera in the current image.

Affine transformations only support translation, in-plane rotation and scale. This again results in fast linear warping but since the plane where all points lie on has to be always parallel to the image plane, the range of applications is very limited.

For example, the authors in [3] use the orientation of a mobile capturing device measured by accelerometers to rectify images they use as a template image. During alignment of current camera images with the template image, they do however not consider the orientation of the device at all.

The authors in [4] use a gyroscope attached to the camera to predict the position and orientation of features they track from a current image to the next current image in a KLT tracker. This is particularly useful for fast camera movements.

The authors in [5] use inertial sensors attached to a stereo camera to determine which features lie on the ground plane and which do not. Also they are able to detect vertical features originating from the ground plane such as the corners of a room.

While the approaches to combine inertial sensors with computer vision described above do not aim at registering at least part of a camera image with a template image, affine transformations and weak perspective projections only deliver approximations to the problem. These only work for very specific cases.

It would therefore be desirable to have a technique to gain the collineation warping function needed to register at least part of a current camera image with at least part of a template image for arbitrary camera positions and orientations that delivers similar results as standard approaches at lower computational costs.

SUMMARY OF THE INVENTION

According to an aspect of the invention, there is provided a method for registering at least one part of a first and a second image, comprising the steps of:
  a. providing a first image of the real environment and a coordinate system associated to the first image,
  b. providing a second image of the real environment,
  c. providing measurements of orientation and/or distance of a capturing device with respect to the real environment while capturing the second image,
  d. determining a collineation warping function from the measurements associated to at least one part of the second image,
  e. transforming the at least one part of the second image by applying the corresponding determined collineation warping function,
  f. determining a second warping function for registering the transformed at least one part of the second image and the at least one part of the first image by means of an image registration method, and
  g. registering the at least one part of the second image and the at least one part of the first image using the collineation warping function and the second warping function.

Accordingly, the present invention proposes to reduce the complexity of finding the collineation warping function W as mentioned above, needed to spatially register a captured current image with a template image by incorporating the measured orientation of the capturing device. Particularly, the collineation warping function W may be decomposed into a collineation warping function P that can be computed directly from the measured orientation, followed by an affine transformation A that needs to be estimated. Finding A is cheaper and more stable than finding W as it requires fewer parameters to be estimated, as set out in more detail below.

According to an embodiment, the measurements of orientation are provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

According to a further embodiment, the measurements of distance are provided by at least one of a time-of-flight camera, a stereo camera, triangulation of radio signals, difference of phase measurements, or a device using a structured-light-based approach. A sensor providing distance information may be a device using a structured-light-based approach where the light is visible or infra-red (e.g. Microsoft's known Kinect camera).

According to an embodiment, the measurements of orientation comprise a two-dimensional rotation computed based on a measurement of a gravity vector. For example, the at least one part of the first image corresponds to a physical object placed at a known orientation with respect the measured gravity vector. The collineation warping function may then be related to a virtual image plane which is at the known orientation with respect to the measured gravity vector.

According to another embodiment, the measurements of orientation include a three-dimensional rotation of a capturing device with respect to the real environment while capturing the second image by the capturing device.

For example, from the measurements of orientation and/or distance, the orientation of a capturing device with respect to the coordinate system associated to the first image is computed and used for determining the collineation warping function in step d). The collineation warping function may be related to a virtual image plane aligned to the coordinate system.

According to a further development, furthermore from the measurements of distance, the distance of the capturing device to a physical object is determined for computing a one-dimensional translation of the capturing device in the coordinate system.

For example, the orientation is determined from the measurements of distance of a set of N points in the second image, wherein N is at least three.

According to an embodiment, the first and/or second image is an image of an three-dimensional physical object which is assumed to be piece-wise planar. For example, the second warping function is an affine warping function.

According to a further embodiment, the image registration method is based on an iterative minimization process, wherein a first set of pixels in the first image is compared with a computed set of pixels in the second image and the computed set of pixels in the second image used for the comparison varies at each iteration. For example, the comparison in the registration is based on image intensity differences. In this way, a photometric error may be computed. This error may be used in the cost function of a non-linear optimization that searches for an update of a parameter set.

The second warping function can be determined with a method using gradient descent such as the inverse compositional, inverse additive, forward compositional or the forward additive approach, as described in [6]. Further, the second warping function can determined with a learning-based method where different views of the template image (first image) have been pre-computed and the closest pre-computed transformation to the current transformation is determined, such as described in [1] or [7].

Particularly, an initial estimate of the parameters of the second warping function may be provided to the iterative minimization process. For example, the initial estimate of the parameters of the warping function is determined using an estimate of a motion of the capturing device between capturing the first image and capturing the second image.

According to an embodiment of the invention, in step c) at least a third image (e.g., one or more further template images) and a respective associated coordinate system are further provided, and the second image at least partly contains an object of the first image and of the at least third image, wherein steps d)-g) are conducted for the first image and the at least third image individually.

For example, the first image and/or at least third image and their associated coordinate systems are acquired offline According to another embodiment, the first image and/or at least third image and their associated coordinate systems are acquired and/or updated online. In this case, besides finding the transformation between a coplanar template lying on a horizontal plane and the corresponding area in a current image, the transformation between coplanar horizontal areas in two or more current images can be found in the same way. However, all images need to be projected onto the virtual image plane.

This allows for image stitching to gain panoramas of the floor or ceiling. An interesting property is that points that do not lie on the plane used for stitching, e.g. small objects lying on the floor or a lamp at the ceiling, can easily be identified, since the appearance of the pixels they cover differs in the projected camera image depending on the camera position while all points on the plane ideally keep their appearance. This can be used for automatic dense segmentation of a ground plane.

In a possible implementation of the invention, the result of the registering of the at least one part of the second image is used for determining the pose of the capturing device. For example, the determined pose of the capturing device is used in an augmented reality application.

Another aspect of the invention is also related to a computer program product which is adapted to be loaded into the internal memory of a digital computer and comprises software code sections by means of which the method according to the invention is performed when said product is running on said computer.

BRIEF DESCRIPTION OF THE DRAWINGS

The invention will now be explained with reference to the following description of exemplary embodiments together with accompanying drawings, in which.

DETAILED DESCRIPTION OF THE INVENTION

With reference to the following Figures, embodiments of a method according to aspects of the invention will be explained in more detail. The skilled person will understand that the following description is only an example of a possible implementation of aspects of the method according to the invention, and that the method or steps thereof may also be used in any other fields or applications where registering of a first and a second image shall be made.

In the following, it is supposed that there is provided a capturing device D, such as a camera for capturing images of a real environment, with an estimate of the intrinsic parameters, i.e. the intrinsic camera parameters. Attached is a device that delivers measurements of the camera's orientation R either directly or determined from measured distances of at least three points in the environment and captured in the image. We intend to spatially register a current camera image I with a template T. In the following we propose means to reduce the complexity of the visual registration of T and I by incorporating the measured orientation R of the capturing device D. For reasons of clarity and readability the explanation deals with a template image representing an orthofrontal view of a planar object and we aim to register the entire template T with the corresponding pixels in I. However, the method can also be generalized to targets that can be considered piece-wise planar. This can be simply done, for example, by associating parts of the template image to local planar regions of a physical object.

Figure 1:
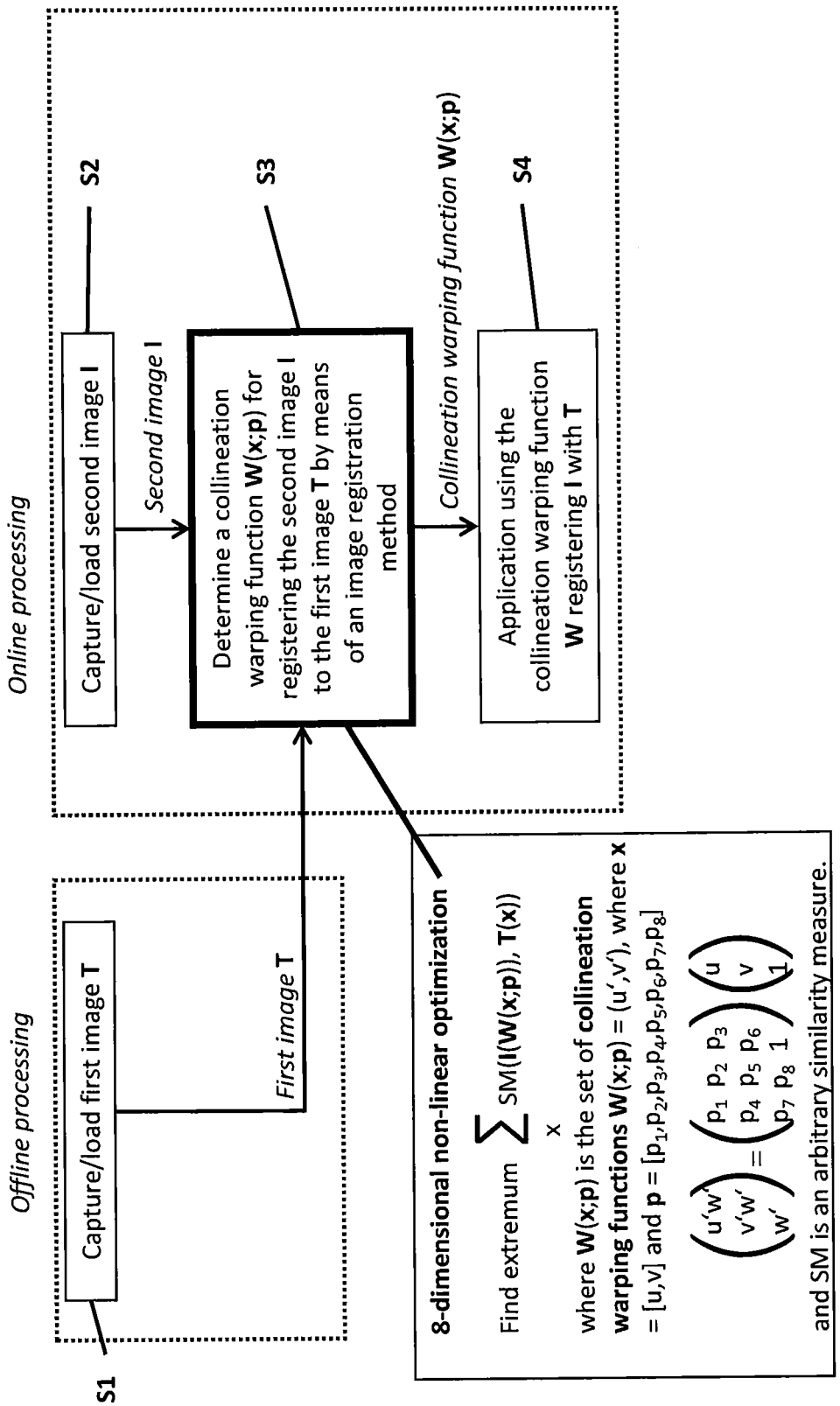
FIG. 1 shows a flow diagram of a standard approach for image registration.
Figure 2:
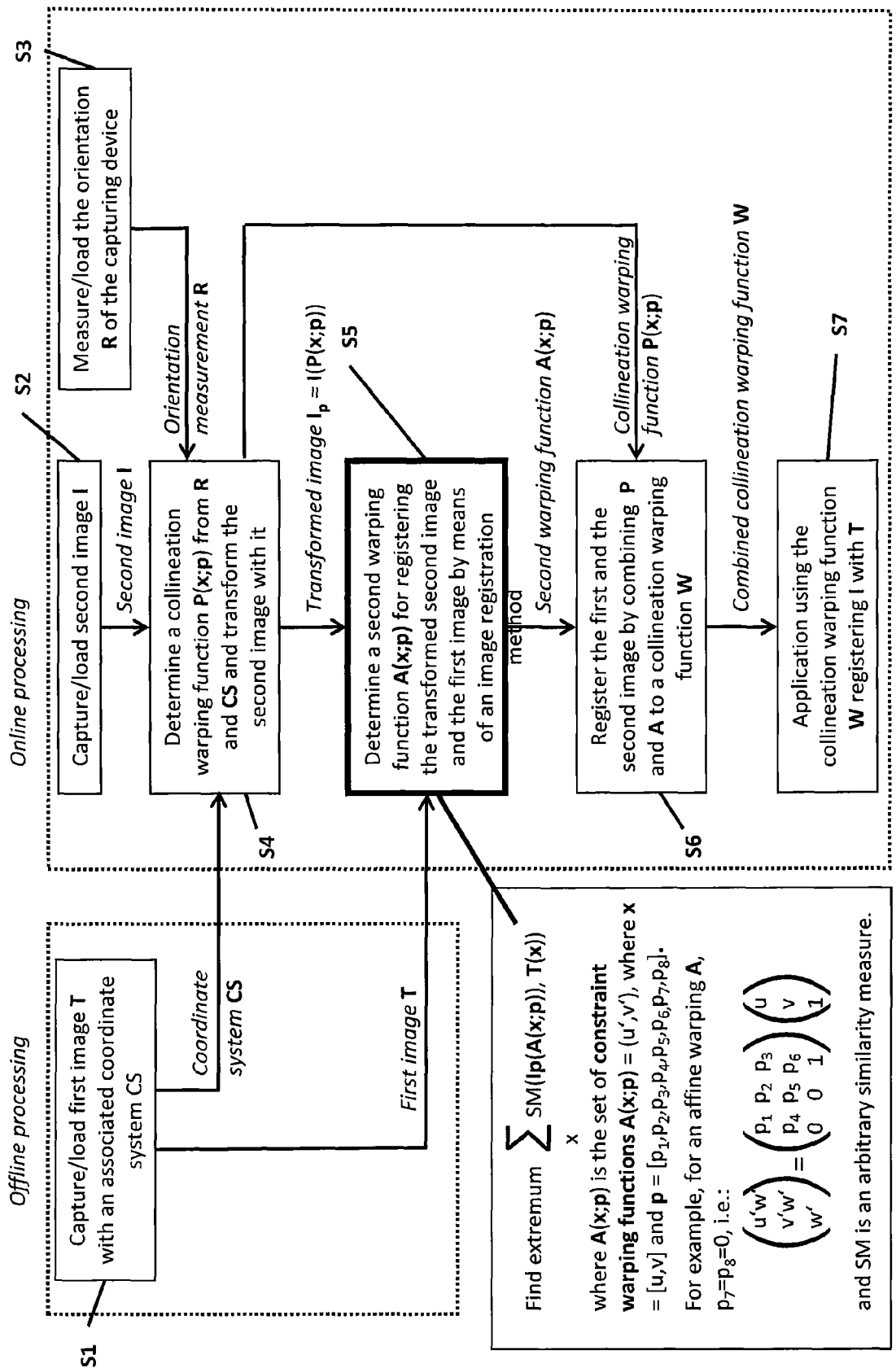
FIG. 2 shows a flow diagram of an exemplary approach for image registration according to an embodiment of the invention.
Figure 4:
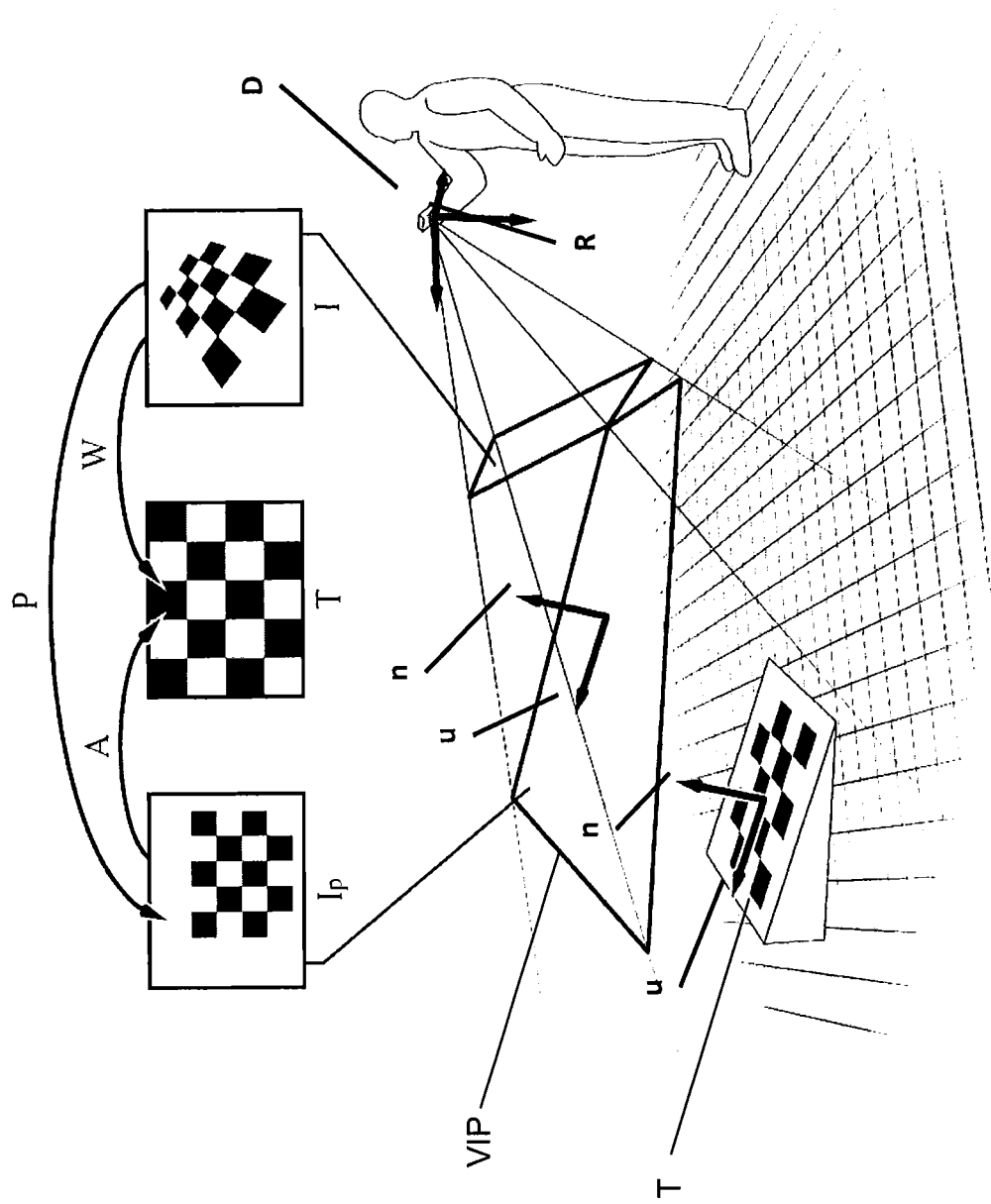
FIG. 4 shows a visualization of a registering process of a template image and a current image captured by a camera according to an embodiment of the invention, using a known 3DoF camera orientation and a known arbitrary template orientation.
Figure 5:
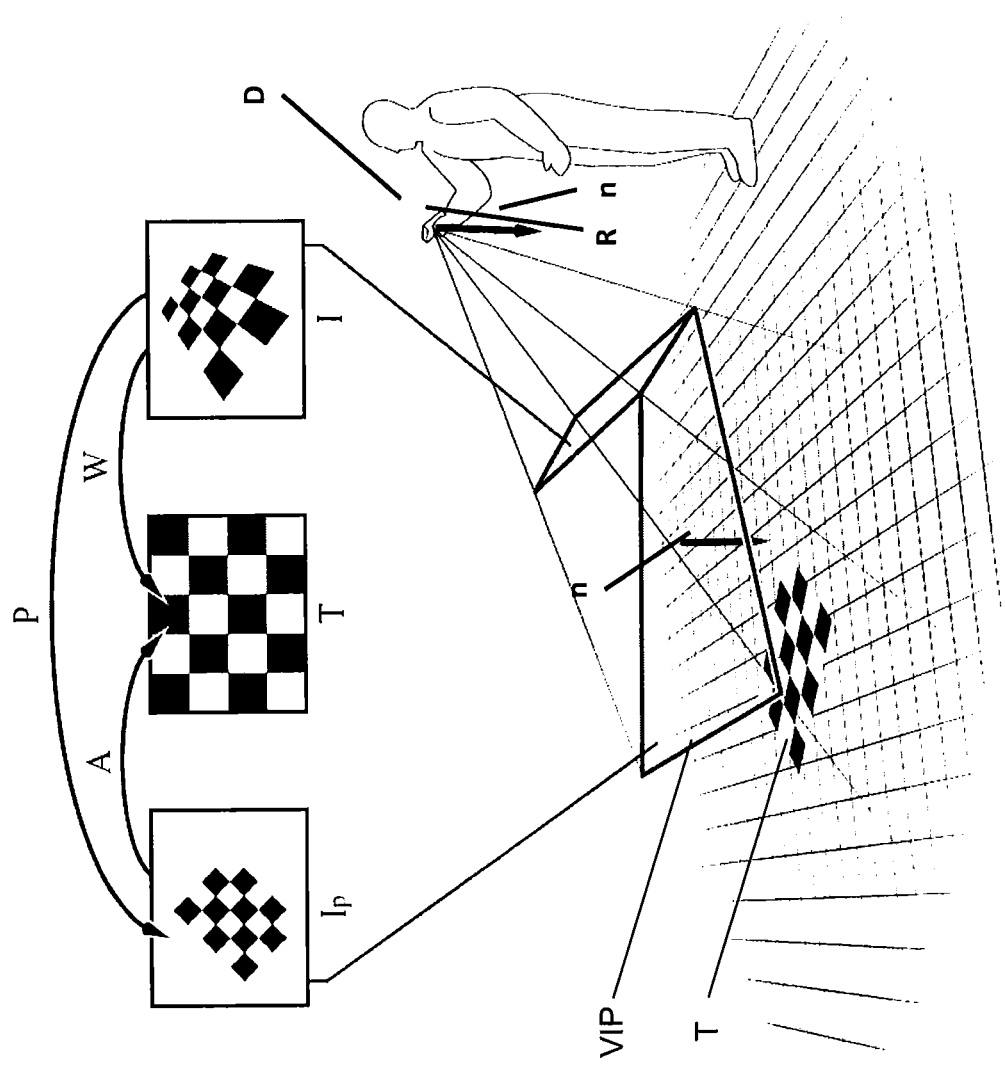
FIG. 5 shows a visualization of another registering process of a template image and a current image captured by a camera according to an embodiment of the invention, using a known 2DoF camera orientation and a leveled template.
Figure 6:
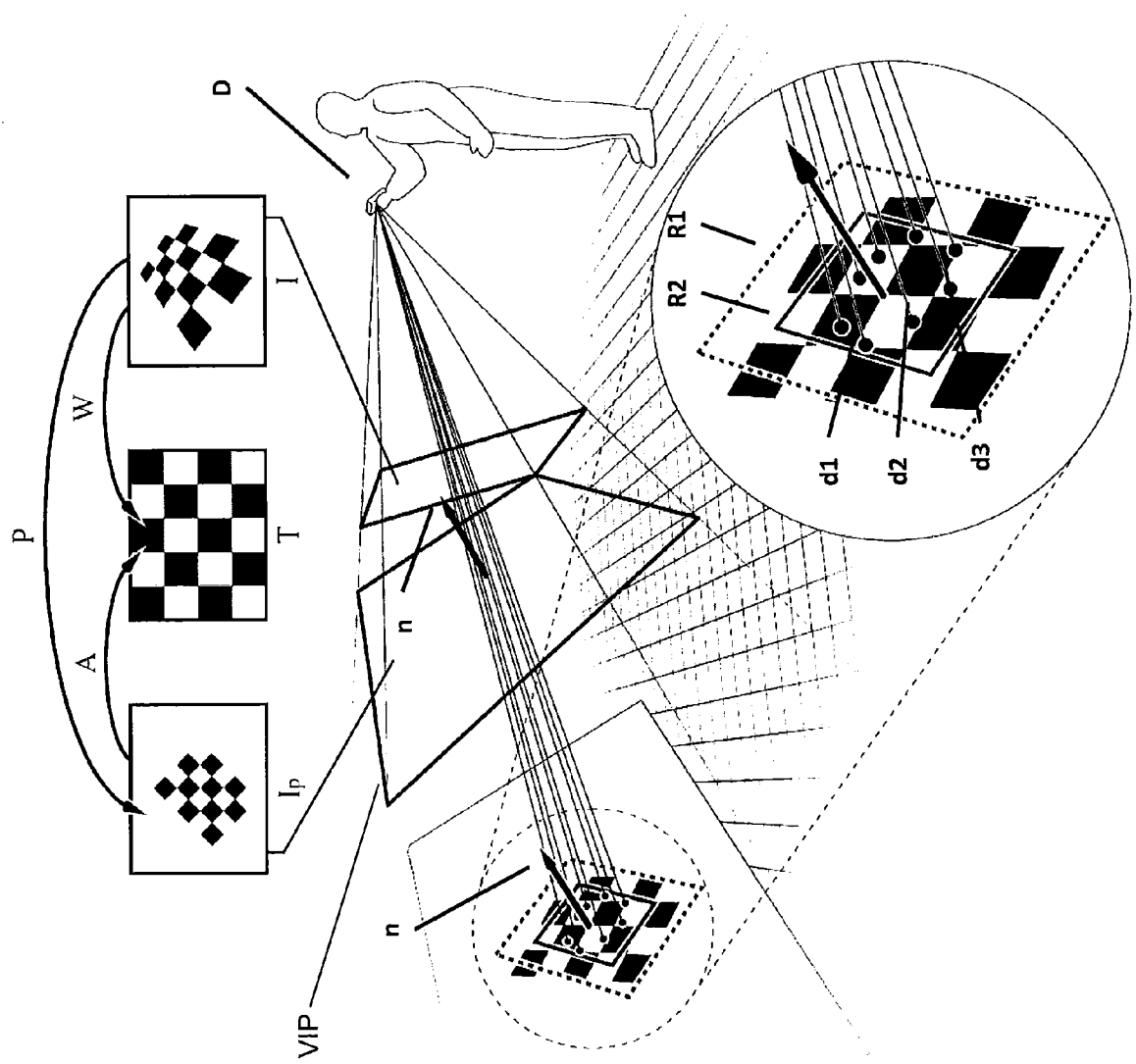
FIG. 6 shows a visualization of another registering process of a template image and a current image captured by a camera according to an embodiment of the invention, using a depth sensing camera and unknown arbitrary template orientation.

In the following, reference is made to FIG. 2 showing a flow diagram of an exemplary approach for image registration according to an embodiment of the invention. FIG. 2 shows an approach in general, which will be further explained according to examples as depicted in FIGS. 4-6. The approach according to aspects of the invention for finding the collineation warping function W that registers at least part of a planar template T and its corresponding position in a current camera image I taken under an arbitrary viewing angle is to first capture or load a first image T as template with an associated coordinate system CS in step S1. In step S2 a second image I as a current camera image is either loaded or captured. In step S3 the orientation of the capturing device (i.e. camera) is measured or the orientation at the time the second image was taken is loaded. The device orientation R, the coordinate system CS and the second image I are used in step S4 to compute the projection of the second image I onto a virtual image plane VIP. This transformation is done with the collineation warping function P which is a function of the camera orientation R and CS.

The transformation to register the transformed image Ip with the first image T is linear and can be described with an affine homography. This homography A is estimated in step S5 (e.g., calculated in an iterative minimization process, for example using the known algorithm of Lucas Kanade [2]). There are again many ways to do this, but since homography A is an affine homography, estimating it is less computational complex than estimating a collineation warping function as described above with reference to standard approaches. In the following step S6, a collineation warping function W transforming the at least one part of the original current image is computed as a combination of P and A. Finally in step S7 the application, such as an augmented reality application, uses this projective transformation W. It is understood by a person skilled in the art, that both in step S5 and step S6, the registration can be achieved by warping in either direction. For example, in step S5, A can be determined such that the transformed image Ip is registered to the first image T, or the inverse of A can be determined by registering the first image T to the transformed image Ip.

Figure 3:
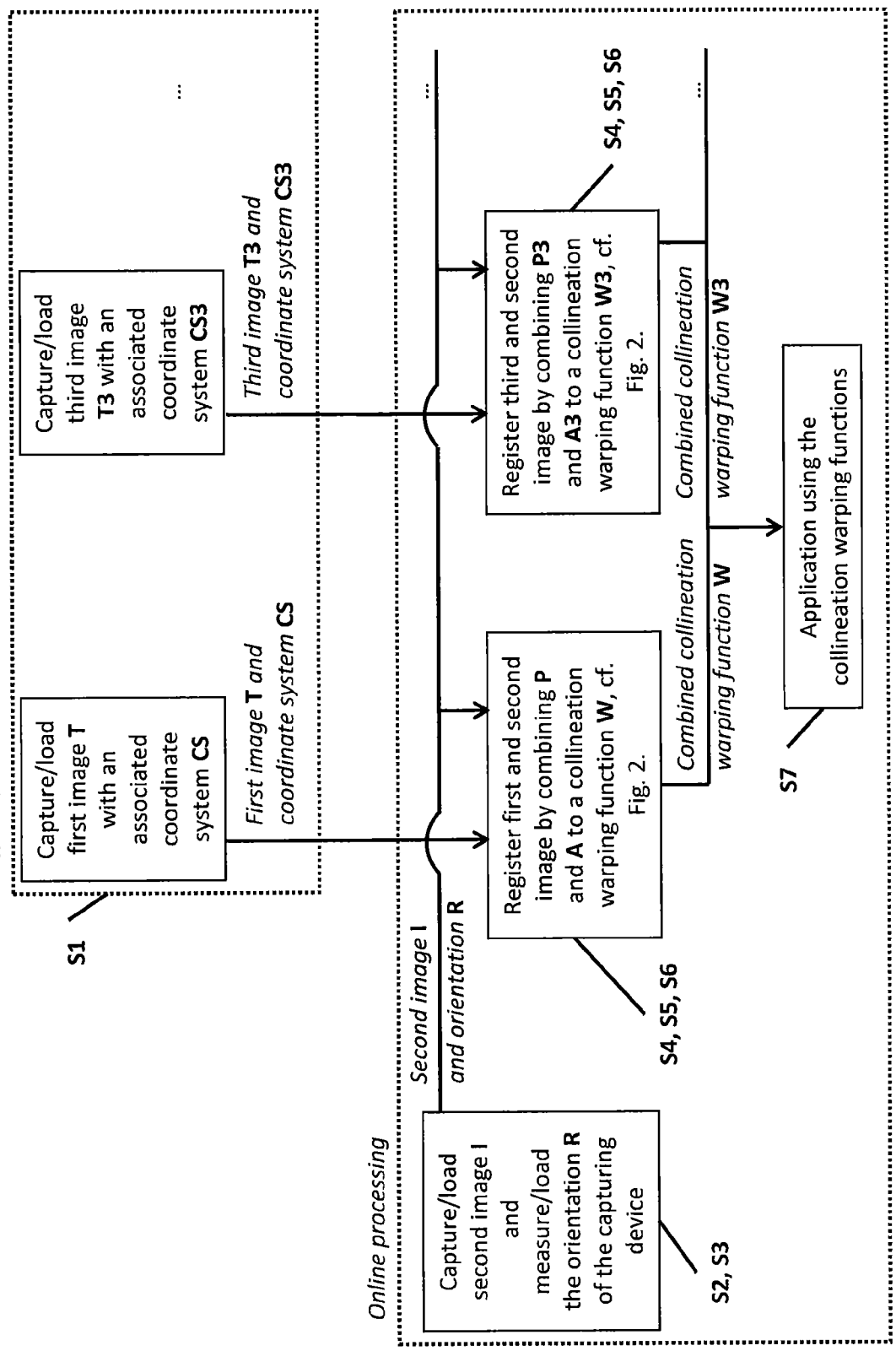
FIG. 3 shows a flow diagram of an exemplary approach for image registration with at least a third image according to an embodiment of the invention.

In an embodiment of the invention where at least a third image T3 and an associated coordinate system CS3 are further provided, and the third image is an additional template image, the flow diagram in FIG. 2 would be extended as shown in FIG. 3. In step S1 of FIG. 3 at least a third image T3 with an associated coordinate system CS3 is provided in addition to the first image T and its associated coordinate system CS. As before, in steps S2 and S3 of FIG. 3 a second image I is either captured or loaded and the orientation R of the capturing device D is measured or loaded. Then I and R are provided to the core algorithm registering the current image I with a template image in steps S4, S5 and S6. Each template image with associated coordinate system, i.e. the first and the at least third image, are processed by an instance of the core algorithm conducting steps S4-S6. The resulting collineation warping functions W, W3, . . . are finally used in an application in step S7.

A fundamental difference and improvement over standard approaches is that the collineation warping function W is decomposed into a constrained, e.g. affine transformation A and a collineation warping function P that can be computed directly from the measured orientation R of the capturing device D. Registering the original current image I with the template image T—as done in standard approaches—is an eight-dimensional non-linear optimization problem finding a non-linear warping function W with an image registration method. In this case a full collineation warping function has to be estimated. In the new approach according to the invention, it is only necessary to determine transformation A which is constrained, for example, affine This makes the proposed approach both faster and more stable than standard approaches. For image registration techniques based on pre-computed views of the template the new approach in addition requires less memory.

In the following aspects of the method according to the invention will be explained with reference to three exemplary implementations that are depicted in FIGS. 4-6.

FIG. 4 depicts a visualization of a registering to a planar template at an arbitrary but known orientation (i.e., a normal n of the planar template image T is known as well as the rotation for defining a vector u) and given the current 3DoF orientation of the capturing device. If the measured orientation R of the capturing device D describes a three-dimensional rotation with respect to a static world coordinate system, it is proposed to define the three-dimensional normal n of the static planar template image T and one perpendicular vector u in the world coordinate system either offline or online. At runtime, n and u can be updated to account for drift of the orientation measures.

Given n, u and the current orientation R of the capturing device D, it is proposed to project the current camera image I onto a virtual image plane VIP which is perpendicular to the known normal n of the template image T and aligned with the known vector u of the template image T using a collineation warping function P (cf. FIG. 4).

In this transformed image Ip, any set of points lying on the template image T will be represented mathematically similar and upright. More precisely, the appearance in image Ip is the result of a uniform scaling followed by a translation of the original points in image T. Registering this transformed current image Ip to the template image T is then a three-dimensional non-linear optimization problem finding a linear warping as the transformation can be fully described with an affine homography A that only supports uniform scaling and translation in x and y (the two image axes).

In summary, with reference to the flow diagram of FIG. 2, in the example of FIG. 4 the following assumptions or implementations, respectively, are made: current 3DoF orientation of the capturing device is known; the orientation of template image T with respect to a global coordinate system is known; step S3 may be implemented with any device capable of measuring the 3D orientation of the capturing device D in a global coordinate system; the orientation measurement R is a 3D rotation in a global coordinate system, P(x,p) represents the projection onto a virtual image plane VIP aligned with the device coordinate system; A(x,p) is an affine homography supporting x,y,z translation (3D).

FIG. 5 depicts a visualization of registering to a horizontal planar template given a 2DoF camera orientation relative to the gravity. Some sensors like inertial sensors only provide the 2-dimensional rotation of the capturing device with respect to the gravity vector. In this case the orientation measurements R only describe the direction of the gravity vector. Here a similar approach as described with reference to FIG. 4 can be used that is limited to templates lying on a leveled (horizontal) plane, e.g. a magazine lying on a table, a mosaic on the floor or a painted ceiling By means of a collineation warping function P, we project the current camera image I onto a virtual image plane VIP which is perpendicular to the measured gravity n. This results in a transformed image Ip in which any set of points lying on the template image T will be represented mathematically similar. More precisely, the appearance in Ip is congruent to the result of a uniform scaling of the original points. Or visually speaking the transformed camera image Ip appears as if taken orthogonally from the top of the template image T (cf. FIG. 5).

Registering this transformed current image Ip to the template image T is then a six-dimensional non-linear optimization problem finding a linear warping as the transformation can be fully described with an affine homography A. This homography supports translation along the two image axes, uniform scale and in-plane rotation only.

In summary, with reference to the flow diagram of FIG. 2, in the example of FIG. 5 the following assumptions or implementations, respectively, are made: the template image T is on a leveled plane; step S3 may be implemented with an accelerometer; the orientation measurement R is the direction of the gravity and therefore a 2D rotation; P(x,p) represents the projection onto a virtual image plane VIP perpendicular to the measured gravity; and A(x,p) is an affine homography supporting x,y,z translation and in-plane rotation (4D).

FIG. 6 depicts a visualization of registering to an arbitrarily oriented planar template given the normal of the template in the camera coordinate system. If the capturing device or an attached device D provides measured depth information for particular pixels of the current image I and if the intrinsic camera parameters are known, the 3D position of individual pixels in the coordinate system of the camera can be computed. After the current camera image I has been successfully registered with the arbitrarily oriented template image T using a standard approach, in subsequent current images we propose to first sample the measured depths (d1, d2, d3, dN) of at least three pixels in the current camera image I close to the central area (R2) where the template has been in the last current image (area R1), cf. FIG. 6. The assumption here is that these pixels still contain the template in the current image. We then fit a plane to the 3D points corresponding to the sampled pixels and use this plane with the normal n as virtual image plane VIP as illustrated in FIG. 6.

The current camera image I projected to this virtual image plane VIP using the collineation warping function P will be called Ip. Spatially registering it with the template image T can be described with an affine homography A supporting translation in x and y (the image axes), in plane rotation and uniform scale.

In summary, with reference to the flow diagram of FIG. 2, in the example of FIG. 6 the following assumptions or implementations, respectively, are made: Step S3 is implemented using a depth sensing camera such as the known Microsoft Kinect camera sampling the depth of at least three pixels in the camera image that are assumed to contain the template; the orientation measurement R is the direction of the normal of the template in the capturing device coordinate system and therefore a 2D rotation; P(x,p) represents the projection onto a virtual image plane VIP perpendicular to the measured normal of the template; A(x,p) is an affine homography supporting x,y,z translation and in-plane rotation (4D).

In the following, further optional improvements or additional applications of aspects of the invention will be described. The skilled person will appreciate that the following description describes a possible application scenario of aspects of the invention without limiting the invention to this field of application. In a preferred embodiment, the invention could be used in a real-time augmented reality application running on a mobile computing device equipped with a camera. The objective of the application is, e.g., to overlay virtual information such as computer graphic models on a live video stream capturing a real planar object lying on a horizontal surface. The overlay done in such application respects the relative pose between the camera and the planar object, meaning the computer graphic model is seamlessly integrated in the live video stream also when the mobile device is changing its position and orientation with respect to the planar object. The application running on the mobile computing device may include an algorithm that provides the relative position (3D translation) and orientation (3D rotation) of the camera with respect to the planar object lying on the horizontal surface. The 3D translation and rotation can be obtained from the (3×3) collineation matrix which means that the algorithm first finds the optimal (3×3) collineation matrix that transforms a reference image to the currently acquired image, and then extracts the 3D translation and rotation knowing the intrinsic parameters of the camera of the mobile computing device.

In this context, if the orientation of the mobile computing device with respect to the gravity vector is used, such data could be provided by an inertial sensor, and given the fact that the planar object is lying on a horizontal surface, it is possible to pre-warp the current images such that the unknown collineation matrix becomes affine. This approach improves the process of determining the 3D translation and rotation needed for the seamless integration of the computer graphic models on the live video stream in terms of computational requirements and in terms of efficiency as the unknown degrees of freedom are reduced.

Although this invention has been shown and described with respect to the detailed embodiments thereof, it will be understood by those skilled in the art that various changes in form and detail may be made without departing from the spirit and scope of the invention.

What is claimed is:

1. A method for registering at least one part of a first image and at least one part of a second image, comprising the steps of:
   a. providing a first image of the real environment and a coordinate system associated to the first image;
   b. providing a second image of the real environment;
   c. providing measurements of orientation and/or distance of a capturing device with respect to the real environment while capturing the second image;
   d. determining a collineation warping function from the measurements associated to at least one part of the second image;
   e. transforming the at least one part of the second image by applying the corresponding determined collineation warping function;
   f. determining a second warping function for registering the transformed at least one part of the second image and the at least one part of the first image by means of an image registration method; and
   g. registering the at least one part of the second image and the at least one part of the first image by combining the collineation warping function and the second warping function.

2. The method according to claim 1, wherein the measurements of orientation are provided by at least one of an inertial sensor, an accelerometer, a gyroscope, a compass, or a mechanical, electromagnetic, acoustic, or optical tracking system.

3. The method according to claim 1, wherein the measurements of distance are provided by at least one of a time-of-flight camera, a stereo camera, triangulation of radio signals, difference of phase measurements, or a device using a structured-light-based approach.

4. The method according to claim 1, wherein the measurements of orientation comprise a two-dimensional rotation computed based on a measurement of a gravity vector.

5. The method according to claim 4, wherein the at least one part of the first image corresponds to a physical object placed at a known orientation with respect to the measured gravity vector.

6. The method according to claim 5, wherein the collineation warping function is related to a virtual image plane which is at the known orientation with respect to the measured gravity vector.

7. The method according to claim 1, wherein the measurements of orientation include a three-dimensional rotation of a capturing device with respect to the real environment while capturing the second image by the capturing device.

8. The method according to claim 1, wherein from the measurements of orientation and/or distance, the orientation of a capturing device with respect to the coordinate system associated to the first image is computed and used for determining the collineation warping function in step d).

9. The method according to claim 8, wherein the collineation warping function is related to a virtual image plane aligned to the coordinate system.

10. The method according to claim 8, wherein furthermore from the measurements of distance, the distance of the capturing device to a physical object is determined for computing a one-dimensional translation of the capturing device in the coordinate system.

11. The method according to claim 8, wherein the orientation is determined from the measurements of distance of a set of −N points in the second image, wherein N is at least three.

12. The method according to claim 1, wherein the first and/or second image is an image of an object which is assumed to be piece-wise planar.

13. The method according to claim 1, wherein the second warping function is an affine warping function.

14. The method according to claim 1, wherein the image registration method is based on an iterative minimization process, wherein a first set of pixels in the first image is compared with a computed set of pixels in the second image and the computed set of pixels in the second image used for the comparison varies at each iteration.

15. The method according to claim 14, wherein the comparison in the image registration method is based on image intensity differences.

16. The method according to one of claim 14, wherein an initial estimate of the parameters of the second warping function is provided to the iterative minimization process.

17. The method according to claim 16, wherein the initial estimate of the parameters of the warping function is determined using an estimate of a motion of the capturing device between capturing the first image and capturing the second image.

18. The method according to claim 1, wherein in step c)
at least a third image and an associated coordinate system are further provided;
the second image at least partly contains an object of the first image and of the at least third image; and
steps d)-g) are conducted for the first image and the at least third image individually.

19. The method according to claim 18, wherein the first image and/or at least third image and their associated coordinate systems are acquired offline.

20. The method according to claim 18, wherein the first image and/or at least third image and their associated coordinate systems are acquired and/or updated online.

21. The method according to claim 1, wherein the result of the registering of the at least one part of the second image is used for determining the pose of the capturing device.

22. The method according to claim 21, wherein the determined pose of the capturing device is used in an augmented reality application.

23. A non-transistory computer readable medium comprising software code sections that are configured to perform for registering at least one part of a first image and at least one part of a second image, said method comprising the steps of:
a. providing a first image of the real environment and a coordinate system associated to the first image;
b. providing a second image of the real environment;
c. providing measurements of orientation and/or distance of a capturing device with respect to the real environment while capturing the second image;
d. determining a collineation warping function from the measurements associated to at least one part of the second image;
e. transforming the at least one part of the second image by applying the corresponding determined collineation warping function;
f. determining a second warping function for registering the transformed at least one part of the second image and the at least one part of the first image by means of an image registration method; and
g. registering the at least one part of the second image and the at least one part of the first image by combining the collineation warping function and the second warping function.

24. The non-transitory computer readable medium of claim 23, wherein the software code sections are configured to be loaded into an internal memory of a digital computer, and wherein the method is performed by said computer.

* * * * *